United States Patent
Mogna et al.

(10) Patent No.: US 12,509,713 B2
(45) Date of Patent: Dec. 30, 2025

(54) USE OF A CYTOFLUOROMETRY METHOD FOR EVALUATING THE STABILITY AND VIABILITY OF A BIOMASS OF FREEZE-DRIED BACTERIAL CELLS

(71) Applicant: PROBIOTICAL S.P.A., Novara (IT)

(72) Inventors: Vera Mogna, Novara (IT); Marco Pane, Novara (IT); Serena Allesina, Novara (IT)

(73) Assignee: PROBIOTICAL S.P.A., Novara (IT)

( * ) Notice: Subject to any disclaimer, the term of this patent is extended or adjusted under 35 U.S.C. 154(b) by 826 days.

(21) Appl. No.: 17/604,369

(22) PCT Filed: Apr. 17, 2020

(86) PCT No.: PCT/IB2020/053664
§ 371 (c)(1),
(2) Date: Oct. 15, 2021

(87) PCT Pub. No.: WO2020/212934
PCT Pub. Date: Oct. 22, 2020

(65) Prior Publication Data
US 2022/0195482 A1    Jun. 23, 2022

(30) Foreign Application Priority Data
Apr. 18, 2019 (IT) .......... 102019000006066

(51) Int. Cl.
C12Q 1/02 (2006.01)
G01N 33/58 (2006.01)
C12N 1/04 (2006.01)

(52) U.S. Cl.
CPC ............. *C12Q 1/02* (2013.01); *G01N 33/582* (2013.01); *C12N 1/04* (2013.01)

(58) Field of Classification Search
None
See application file for complete search history.

(56) References Cited

U.S. PATENT DOCUMENTS

2004/0043374 A1* 3/2004 DePablo .......... A01N 1/10
                                                        435/1.1
2022/0195378 A1    6/2022 Mogna et al.

FOREIGN PATENT DOCUMENTS

| CN | 1623408 A | 6/2005 |
| EP | 3956434 A1 | 2/2022 |
| EP | 3956463 A1 | 2/2022 |
| GB | 2338244 A | 12/1999 |
| WO | 97/17463 A1 | 5/1997 |
| WO | 2006/125446 A2 | 11/2006 |
| WO | 2014/082050 A1 | 5/2014 |
| WO | 2020/212934 A1 | 10/2020 |
| WO | 2020/212961 A1 | 10/2020 |

OTHER PUBLICATIONS

Martin-Dejardin, et. al. A way to follow the viability of encapsulated Bifidobacterium bifidum subjected to a freeze-drying process in order to target the colon: Interest of flowcytometry. European Journal of Pharmaceutical Sciences 49. Elsevier. pp. 166-174. ( Year: 2013).*
Alakomi H.L. et al., "Application of a microplate scale fluorochrome staining assay for the assessment of viability of probiotic preparations" *Journal of Microbiological Methods*, 2005, 62, pp. 25-35.
BD Bioscience: "Application Note: Bacterial Detection and Live/Dead Discrimination by Flow Cytometry", Jan. 1, 2002 (Jan. 1, 2002), pp. 1-6.
Caza M. et al. "The vacuolar sorting protein Vps45 links iron uptake, mitochondrial function and virulence in the pathogenic fungus Cryptococcus neoformans", *Medical Mycology 20180601 Oxford University Press Nld*, vol. 56, No. Supplement 2, Jun. 1, 2018 (Jun. 1, 2018).
Chiron C. et al., "Flow cytometry: a versatile technology for specific quantification and viability assessment of micro-organisms in multistrain probiotic products" *Journal Of Applied Microbiology.*, vol. 124, No. 2, Jan. 15, 2018 (Jan. 15, 2018), pp. 572-584.
Diaz M. et al: "Application of flow cytometry to industrial microbial bioprocesses", *Biochemical Engineering Journal*, Elsevier, Amsterdam, NI, vol. 48, No. 3, Feb. 15, 2010 (Feb. 15, 2010), pp. 385-407.
International Preliminary Report on Patentability for International Application No. PCT/IB2020/053664 filed on Apr. 17, 2020 on behalf of Probiotical S.P.A. Mail Date: Sep. 28, 2021. 9 pages.
International Preliminary Report on Patentability for International Application No. PCT/IB2020/053732 filed on Apr. 20, 2020 on behalf of Probiotical S.P.A. Mail Date: Sep. 28, 2021. 7 pages.
International Search Report for International Application No. PCT/IB2020/053664 filed on Apr. 17, 2020 on behalf of Probiotical S.P.A. Mail Date: Jun. 8, 2020. 5 pages.
International Search Report for International Application No. PCT/IB2020/053732 filed on Apr. 20, 2020 on behalf of Probiotical S.P.A. Mail Date: Jul. 17, 2020. 4 pages.
Knorr C. et al., "Macrophage-activating lipopeptide-2 (MALP-2) induces a localized inflammatory response in rats resulting in activation of brain sites implicated in fever", Brain Research, Elsevier, Amsterdam, NL, vol. 1205, Apr. 18, 2008 (Apr. 18, 2008), pp. 36-46.
Martin-Dejardin F. et al., "A way to follow the viability of encapsulated Bifidobacterium bifidum subjected to a freeze-drying process in order to target the colon: Interest of flow cytometry" *European Journal Of Pharmaceutical Sciences*, Elsevier, Amsterdam, NI, vol. 49, No. 2, Feb. 28, 2013 (Feb. 28, 2013), pp. 166-174.
Parthuisot N. et al. "A sensitive and rapid method to determine the viability of freeze-dried bacterial cells" *Letters in Applied Microbiology*, vol. 36 No. 6, Jun. 1, 2003 (Jun. 1, 2003), pp. 412-417.

(Continued)

Primary Examiner — Nghi V Nguyen
(74) Attorney, Agent, or Firm — Steinfl + Bruno LLP

(57) ABSTRACT

A method applying cytofluorometry to a biomass of freeze-dried bacterial cells (freeze-dried biomass) is described. The method is performed for evaluating the stability of said freeze-dried bacterial cells. Methods applying cytofluorometry to preparation of a freeze-dried biomass, and for evaluating the integrity of a cell wall present in freeze-dried bacterial cells are also described.

10 Claims, 3 Drawing Sheets

(56) References Cited

OTHER PUBLICATIONS

Written Opinion for International Application No. PCT/IB2020/053664 filed on Apr. 17, 2020 on behalf of Probiotical S.P.A. Mail Date: Jun. 8, 2020. 8 pages.
Written Opinion for International Application No. PCT/IB2020/053732 filed on Apr. 20, 2020 on behalf of Probiotical S.P.A. Mail Date: Jul. 17, 2020. 6 pages.
Annex to the Communication pursuant to Article 94(3) EPC for EP Application No. 20727702.1 filed on Apr. 20, 2020. Dated Oct. 8, 2024. 3 pages.
Bergenholtz, A.S. et al. A case study on stress preconditioning of a Lactobacillus strain prior to freeze-drying. Cryobiology, 64.3 (Online: Jan. 15, 2012): 152-159.
Cantarow, W. et al., "The use of bacterial luciferase and a liquid scintillation spectrometer to assay the enzymatic synthesis of NAD+." Analytical Biochemistry 71.2 (1976): 333-340.
Non-Final for U.S. Appl. No. 17/604,345, filed Oct. 15, 2021 on behalf of Probiotical S.P.A. Mailed on Sep. 20, 2024. 18 pages.
"Potassium pyrophosphate", K4P207, CIT 23740—PubChem, National Library of Medicine, National Center for Biotechnology Information. 44 pages. Retrieved on Mar. 20, 2024 (2024) by the USPTO from website: pubchem.ncbi.nlm.nih.gov/compound/Potassium-pyrophosphate.
Restriction Requirement for U.S. Appl. No. 17/604,345, filed Oct. 15, 2021 on behalf of Probiotical S.P.A. Mailed on Mar. 27, 2024. 13 pages.
Santiesteban-Lopez et al.: "Effect of L-cysteine and ascorbic acid on the propagation of Lactobacillus casei in milk", Apr. 1, 2013. (Apr. 1, 2013), pp. 113-118, XP093210273 (D4).
Search Report and Written Opinion for IT 201900006056. Dated Nov. 12, 2019. 7 pages.
ThermoFisher, product C195, 5(6)-CFDA (5-(and-6)-Carboxyfluorescein Diacetate), mixed isomers. (2024). 6 pages. from website: thermofisher.com/order/catalog/product/C195 on Sep. 19, 2024.
Written Opinion and Search Report for IT 201900006056 filed on Apr. 18, 2019 on behalf of Probiotical S.P.A. Dated Nov. 12, 2019. 7 pages.
Bircher L. et al. "Effect of cryopreservation and lyophilization on viability and growth of strict anaerobic human gut microbes", Microbial Biotechnology, (2018), vol. 11, No. 4, pp. 721-733.
Boyte, Marie-Eve, et al., "Probiotic and postbiotic analytical methods: a perspective of available enumeration techniques", Frontiers in Microbiology, (Dec. 7, 2023), 14: 1304621. 15 pages. Doi: 10.3389/fmicb.2023.1304621.
Canadian application No. 3,136,174 filed on Oct. 5, 2021 on behalf of Probiotical S.P.A. Office Action mailed on Mar. 13, 2025. 5 pages.
Davis, Catherine. "Enumeration of probiotic strains: Review of culture-dependent and alternative techniques to quantify viable bacteria", Journal of Microbiological Methods, 103, 9-17 (ePub: May 9, 2014).
Final Office Action for U.S. Appl. No. 17/604,345, filed Oct. 15, 2021 on behalf of Probiotical S.P.A. Mailed on Jun. 24, 2025. 17 pages.
Foglia, Chiara et al., "New insights in enumeration methodologies of probiotic cells in finished products", Journal of Microbiological Methods, (ePub Jul. 2, 2020), 175, 105993. 6 pages.
Korean Office Action for 10-2021-7037690 filed on Apr. 17, 2020 on behalf of Probiotical S.P.A. Mailed on Apr. 18, 2025. Original and English Summary. 7 pages.
"Lactobacilli MRA Agar, Lactobacilli MRS Broth", DifcoTM and BBLTM Manual, 2nd Edition. Retrieved from web on Jun. 10, 2025. 2 pages. Website: //d163axztg8am2h.cloudfront.net/static/doc/2e/c7/3ee1c2346f6a5ca08af55031bda7.pdf.
"MRS Agar" Retrieved from web on Jun. 10, 2025. 2 pages. Website: www.weberscientific.com/mrs-agar-isolation-and-cultivation-of-lactobacilli?srsltid=AfmBOooJnJ75hwOByA_AQiPTGTK24g3IrPoGdaMcu8C05fIEJI7Mu3KN.
Rodrigues, D. et al., "Influence of L-cysteine, oxygen and relative humidity upon survival throughout storage of probiotic bacteria in whey protein-based microcapsules", International Dairy Journal, (2011), vol. 21, No. 11, pp. 869-876.
Visciglia, A. et al., "Assessment of shelf-life and metabolic viability of a multi-strain symbiotic using standard and innovative enumeration technologies", Frontiers in Microbiology, (Nov. 4, 2022), 13: 989563. 8 pages. Doi: 10.3389/fmicb.2022.989563.
Wietzel, M.L. Jane, et al., "Improving and Comparing Probiotic Plate Count Methods by Analytical Procedure Lifecycle Management", Frontiers in Microbiology, (Jul. 12, 2021), 12: 693066. 17 pages. Doi: 10.3389/fmicb.2021.693066.
Bravo-Ferrada, B. M. et al. "Effect of protective agents and previous acclimation on ethanol resistance of frozen and freeze-dried Lactobacillus Plantarum strains", Cryobiology, 71 (3), pp. 522-528, Nov. 14, 2015.
Office Action dated Oct. 23, 2025 for Canadian Application No. 3,136,168 on behalf of Probiotical S.P.A. 5 pages.

* cited by examiner

| Sample | | Cytofluorometry count ISO 19344:2015 | | | | | | Plate count according to different ISO* | | Correlation factor (CF) CM/UFC |
|---|---|---|---|---|---|---|---|---|---|---|
| | | billion/ml | | | billion/ml | | | $10^9$ AFU/ml (average value) | $10^9$ AFU/ml | |
| Strain | Step | Integral/ viable | Dam. /dead | Dead /viable | Integral/ viable | Dam. /dead | Dead /viable | | | |
| | iii | 152.8 | 1.120 | 0.7 | 168.0 | 2.853 | 1.7 | 160.4 | 145 | 1.11 |
| 2 | i | 5.5 | 0.072 | 1.3 | 8.2 | 0.130 | 1.6 | 6.8 | 6.6 | 1.04 |
| | iii | 45.3 | 1.500 | 3.3 | 50.4 | 2.420 | 4.8 | 47.9 | 35.5 | 1.35 |
| 3 | i | 8.7 | 0.28 | 3.2 | 13.3 | 0.34 | 2.6 | 11.0 | 12.1 | 0.91 |
| | iii | 156.0 | 2.73 | 1.8 | 167.0 | 4.09 | 2.4 | 161.5 | 178.6 | 0.90 |
| 4 | i | 6.6 | 0.03 | 0.5 | 9.7 | 0.06 | 0.6 | 8.2 | 5.4 | 1.51 |
| | iii | 94.3 | 2.62 | 2.8 | 76.4 | 4.09 | 5.4 | 85.4 | 64.5 | 1.32 |
| 5 | i | 7.3 | 0.020 | 0.3 | 9.4 | 0.060 | 0.6 | 8.3 | 7.5 | 1.11 |
| | i | 8.8 | 0.020 | 0.2 | 12.3 | 0.046 | 0.4 | 10.5 | 7.6 | 1.39 |
| | iii | 225.0 | 1.830 | 0.8 | 266.0 | 3.840 | 1.4 | 245.5 | 215 | 1.14 |
| 6 | i | 7.7 | 0.064 | 0.8 | 10.9 | 0.114 | 1.0 | 9.3 | 12 | 0.77 |
| | iii | 73.8 | 1.720 | 2.3 | 96.1 | 2.140 | 2.2 | 85.0 | 57 | 1.49 |
| 7 | i | 1.28 | 0.007 | 0.5 | 1.43 | 0.023 | 1.6 | 1.4 | 1.27 | 1.07 |
| | i | 0.98 | 0.007 | 0.7 | 1.12 | 0.021 | 1.9 | 1.1 | 0.96 | 1.09 |
| | iii | 15.9 | 0.250 | 1.6 | 17.4 | 1.960 | 11.3 | 16.6 | 14 | 1.19 |
| 8 | i | 1.5 | 0.018 | 1.2 | 1.8 | 0.015 | 0.8 | 1.7 | 2.1 | 0.79 |
| | iii | 84.0 | 9.500 | 11.3 | 90.0 | 10.000 | 11.00 | 87.0 | 114 | 0.76 |
| 9 | i | 5.8 | 0.023 | 0.4 | 7.10 | 0.063 | 0.9 | 6.5 | 8.9 | 0.72 |
| | i | 4.0 | 0.014 | 0.4 | 4.40 | 0.025 | 0.6 | 4.2 | 4.5 | 0.93 |
| | iii | 132.0 | 1.000 | 0.8 | 148.0 | 1.500 | 1.0 | 140.0 | 145 | 0.97 |
| 10 | i | 3.90 | 0.023 | 0.6 | 4.30 | 0.033 | 0.8 | 4.1 | 3.7 | 1.11 |
| | i | 3.80 | 0.014 | 0.4 | 4.21 | 0.014 | 0.3 | 4.0 | 4.9 | 0.82 |
| | iii | 104.0 | 6.500 | 6.3 | 118.0 | 7.000 | 5.9 | 111.0 | 97 | 1.14 |
| * ISO selected based on the bacterial species tested | | | | | | | | | Average | 1.06 |

Fig. 1

| Sample | Expected value billion CFU / g | Exp. value billion CFU/g. | Average Exp. value | Recovery % | Recovery Average % |
|---|---|---|---|---|---|
| A | 800 | 780 | 779.67 | 97.50 | 97.46 |
| | | 791 | | 98.88 | |
| | | 768 | | 96.00 | |
| B | 80 | 85 | 81.00 | 106.25 | 101.25 |
| | | 76 | | 95.00 | |
| | | 82 | | 102.50 | |
| C | 8 | 10 | 8.00 | 125.00 | 100.00 |
| | | 7 | | 87.50 | |
| | | 7 | | 87.50 | |
| D | 0.8 | 0.7 | 0.80 | 87.50 | 100.00 |
| | | 0.9 | | 112.50 | |
| | | 0.8 | | 100.00 | |
| E | 0.08 | 0.09 | 0.08 | 112.50 | 100.00 |
| | | 0.08 | | 100.00 | |
| | | 0.07 | | 87.50 | |
| | | | | | 99.742 |

Fig. 2

| Sample | Expected value billion CFU / g | Exp. value billion AFU/g. | Average Exp. value | Recovery % | Recovery Average % |
|---|---|---|---|---|---|
| A | 800 | 1,020 | 1,011.67 | 127.50 | 126.46 |
| | | 1,005 | | 125.63 | |
| | | 1,010 | | 126.25 | |
| B | 80 | 98 | 102.33 | 122.50 | 127.92 |
| | | 99 | | 123.75 | |
| | | 110 | | 137.50 | |
| C | 8 | 10 | 10.00 | 125.00 | 125.00 |
| | | 11 | | 137.50 | |
| | | 9 | | 112.50 | |
| D | 0.8 | 1.10 | 1.17 | 137.50 | 145.83 |
| | | 1.30 | | 162.50 | |
| | | 1.10 | | 137.50 | |
| E | 0.08 | 0.11 | 0.12 | 137.50 | 154.17 |
| | | 0.13 | | 162.50 | |
| | | 0.13 | | 162.50 | |
| | | | | | 135.88 |

Fig. 3

USE OF A CYTOFLUOROMETRY METHOD FOR EVALUATING THE STABILITY AND VIABILITY OF A BIOMASS OF FREEZE-DRIED BACTERIAL CELLS

CROSS REFERENCE TO RELATED APPLICATIONS

The present application is the U.S. national stage of International Patent No. Application No. PCT/IB2020/053664 filed internationally on Apr. 17, 2020, which, is herein incorporated by reference in its entirety and in turn, claims priority to Italian Patent Application No. 102019000006066 filed on Apr. 18, 2019.

FIELD OF THE INVENTION

The present invention regards the use of a cytofluorometry method for evaluating the stability and viability of a biomass of freeze-dried bacterial cells.

BACKGROUND OF THE INVENTION

In the field of the production of probiotic strains aimed at the prevention and the treatment of different diseases, as well as in the design and production of probiotic and symbiotic finished products specific for different therapeutic areas it is important that the cells of probiotic bacteria be stable and viable. Stable and viable bacterial cells are useful so that, on the one hand, bacterial cells can have the least decay possible over time even in countries with climatic conditions belonging to zone IV.A and zone IV.B. and, on the other, bacterial cells are effective once administered to a subject.

The cells of bifidobacteria and of lactic bacteria are prokaryotic cells which differ from eukaryotic cells by size, and by the presence—in eukaryotic cells—of the nuclear membrane, which keeps the genetic material, the DNA, clearly separated from the rest of the cell, thus forming a well-defined nucleus. The cell structure of prokaryotes comprises 3 concentric casings which, developing from the inside to the outside, are the plasma membrane, the cell wall and the capsule. The latter is absent in the eukaryotic cell. Thus, the cells of bifidobacteria and of lactic bacteria are characterised by the presence, among other things, of a cell wall whose integrity must be preserved.

The current method of counting bacterial cells carried out by means of plate count which expresses viability in CFU (Colony Forming Units) has limits and drawbacks which strongly limit the application thereof also with regard to a method for the preparation of a biomass of freeze-dried bacterial cells.

As a matter of fact, the plate cell count method has the following drawbacks: 1) there is no single methodology applicable to all probiotic organisms due to the high variability between species and between strains of the same species; 2) the plate cell count method is very laborious and the results are usually available even after 72 hours due to the incubation period to be observed; 3) there are often considerable technical difficulties in determining the appropriate growth conditions for each species, in particular with reference to oxygen-sensitive species; 4) the precision of the method and the reproducibility of the experimental results conducted among different operators in different laboratories are low; 5) the quantification of bacteria in CFU can be significantly underestimated with reference to the real or actual counts of viable cells present in a sample given that the viable but non-culturable cells (VBNC) by definition do not give rise to colonies, and due to the fact that aggregates or chains of microbial cells can give only one colony.

In addition, many limits still remain in the current methods for preparing a biomass of freeze-dried bacterial cells which do not allow to preserve and maintain the cell wall severely tested during the production steps in a good physiological state.

Furthermore, the presence of few ISO methods available to determine the bacterial count, on the one hand, and the presence in the market of probiotic bacterial strains of a wide range of internal count methods developed by the companies in the industry, on the other hand, makes it difficult to compare or confirm the amount/concentration of bacterial strains present in a finished product.

For example, WO 97/17463 discloses a study conducted on cell viability. The same applies to H. L Alakomi et al. (Journal of microbiological methods 62, (2005) 25-35).

However, to date, the use of a cytofluorometry method applied to cultures of freeze-dried lactic bacteria and bifidobacteria to evaluate the integrity of the cell wall of said freeze-dried bacterial cells is not known.

It is therefore clear that the lack of a common method for determining the amount or concentration of bacterial strains present in a finished product which is recognised worldwide, reliable, precise and repeatable creates many uncertainties in the field of probiotic bacterial strain-based products due to the fact that producers and buyers of probiotic bacterial strains have no means for conducting the necessary checks and cannot dose the quantities of finished products in weighted manner also as a function of their effectiveness.

Therefore, it is desirable to have a method for producing a biomass of freeze-dried probiotic bacterial strains, said method being able to establish and determine the amount and concentration of bacterial strains present in the biomass in a reliable, accurate and repeatable manner.

At the same time, it is also desirable to have a biomass of freeze-dried bacterial cells stable even in countries with climatic conditions of zone IV.A (Hot and humid climate—Long-term storage conditions: 30° C./65% R.H.) and zone IV.B. (Hot and very humid climate—Long-term storage conditions: 30° C./75% R.H.) viable, high concentration (measurable in terms of viability) and easy to prepare.

SUMMARY OF THE INVENTION

The present invention regards the use of a cytofluorometry method applied to a method for preparing a biomass of freeze-dried bacterial cells, in which the bacterial cells have a cell wall, and in which said cytofluorometry method allows to evaluate the integrity of said cell wall of said freeze-dried bacterial cells produced.

The freeze-dried bacterial cells, subject of the invention, are cells with a well-preserved cell wall (or cell membrane wall) in a good physiological state and they therefore are integral and viable cells. The integrity of the cell wall (or of the cell membrane wall) is measured and evaluated by means of a cytofluorometry method applied to all steps of the method for preparing a biomass of bacterial cells. The integrity of the cell wall confers the cells a greater stability in terms of viability expressed in AFU and determined by means of a cytofluorometry method. The stability is greater than the stability determined on the same cells by means of plate count and expressed in CFU. A greater stability allows to have a biomass of bacterial cells with a prolonged shelf-life, while a greater cell viability allows to have a greater activity and effectiveness once used or administered to a subject being treated. Furthermore, the possibility of measuring and determining the amount and concentration of viable cells in a biomass allows to have a repeatable, reliable and systematic preparation method.

Forming an object of the present invention is a cytofluorometry method applied to a biomass of freeze-dried bacterial cells, having the characteristics as indicated in the attached claims.

Forming an object of the present invention is the use of a cytofluorometry method applied to a biomass of freeze-dried bacterial cells (freeze-dried biomass), wherein said cytofluorometry method is for evaluating the stability of said freeze-dried bacterial cells wherein said freeze-dried biomass is produced by means of a method for preparing a biomass of freeze-dried bacterial cells comprising the following steps:

(i) fermenting a previously prepared biomass of bacterial cells (bacterial biomass) comprising at least one strain of bacterial cells to obtain a fermented biomass of bacterial cells (fermented biomass);

(ii) concentrating the fermented biomass obtained from step (i) up to obtaining a concentrated biomass of bacterial cells (concentrated biomass) having a concentration of bacterial cells comprised between $1\times10^5$ cells/ml of liquid biomass and $1\times10^{12}$ cells/ml of liquid biomass;

(iii) mixing the concentrated biomass obtained from step (ii) with a solution comprising, or alternatively, consisting of: (a) at least one phosphorous salt selected from among the group comprising or, alternatively, consisting of a phosphate ion salt or phosphoric acid, a phosphite ion salt or phosphorous acid, a monohydrogen phosphate ion salt, a dihydrogen phosphate ion salt, a pyrophosphate ion salt or pyrophosphoric acid, and the mixtures thereof, and (b) at least one polyhydroxy substance selected from among the group comprising or, alternatively, consisting of sucrose, fructose, lactose, lactitol, trehalose or mannitol, and the mixtures thereof, and preferably (c) L-cysteine, to obtain a cryoprotected biomass of bacterial cells (cryoprotected biomass);

(iv) freeze-drying the cryoprotected biomass obtained from step (iii) to obtain the freeze-dried biomass.

Forming another object of the present invention is the use of a cytofluorometry method applied to a method for preparing a biomass of freeze-dried bacterial cells, having the characteristics as indicated in the attached claims.

Forming yet another object of the present invention is the use of a cytofluorometry method for evaluating the integrity of the cell wall present in freeze-dried bacterial cells produced with a method for preparing a biomass of freeze-dried bacterial cells, having the characteristics as indicated in the attached claims.

Forming another object of the present invention is a method for evaluating the integrity of the cell wall of freeze-dried bacterial cells, having the characteristics as claimed in the attached claims.

Forming another object of the present invention is a cytofluorometry method applied to a biomass of freeze-dried bacterial cells (freeze-dried biomass), having the characteristics as defined in the attached claims.

Preferred embodiments of the present invention are described in greater detail hereinafter without intending to limit the scope of protection of the present invention in any manner whatsoever.

BRIEF DESCRIPTION OF THE DRAWINGS

The present invention will now be described with reference to the attached drawings, provided solely by way of non-limiting example, wherein:

FIG. 1 shows an AFU/ml vs. CFU/ml correlation in liquid biomasses such as the biomasses obtained from step (i), step (ii) or step (iii);

FIG. 2 and FIG. 3 show a CFU/g correlation (FIG. 2); AFU/g reference method (FIG. 3) on freeze-dried biomass obtained from step (iv) at various bacterial cell concentrations.

DETAILED DESCRIPTION OF THE INVENTION

After a long and intense research and development activity, the Applicant realised the importance of determining and evaluating of the integrity of the cell wall of the bacteria (cell wall) present in a biomass (set of bacterial cells). Basically, the Applicant realised that the integrity (a greater integrity corresponds to a lower permeability) of the cell wall and the determination/measurement thereof in a repeatable, reliable and precise manner allows to quantify the stability and viability of a biomass of freeze-dried bacterial cells.

The experimental findings confirmed that the use of a cytofluorometry method allows to determine and evaluate the state of preservation and integrity of the cell wall during all the steps of preparing a biomass of freeze-dried bacterial cells, allowing to produce bacterial cells with a stability, in terms of viability expressed in AFU and measured/determined by means of a cytofluorometry method, greater than the stability determined on the cells by means of plate count and expressed in CFU.

Surprisingly, the application of a cytofluorometry method allows to correlate the "culturability" cell parameter (CFU)—i.e. the ability of bacterial cells to replicate in plate—with a physical/physiological parameter of cell integrity and viability (AFU), i.e. active fluorescent units in the different steps of the process (i), (ii) and/or (iii), and (iv).

The present invention refers to a use of a cytofluorometry method applied to a biomass of freeze-dried bacterial cells (freeze-dried biomass), wherein said cytofluorometry method is for evaluating the stability of said freeze-dried bacterial cells wherein said freeze-dried biomass is produced by means of a method for preparing a biomass of freeze-dried bacterial cells comprising the following steps:

(i) fermenting a previously prepared biomass of bacterial cells (bacterial biomass) comprising at least one strain of bacterial cells to obtain a fermented biomass of bacterial cells (fermented biomass);

(ii) concentrating the fermented biomass obtained from step (i) up to obtaining a concentrated biomass of bacterial cells (concentrated biomass) having a concentration of bacterial cells comprised between $1\times10^3$ cells/ml of liquid biomass and $1\times10^{12}$ cells/ml of liquid biomass;

(iii) mixing the concentrated biomass obtained from step (ii) with a solution comprising, or alternatively, consisting of: (a) at least one phosphorous salt selected from among the group comprising or, alternatively, consisting of a phosphate ion salt or phosphoric acid, a phosphite ion salt or phosphorous acid, a monohydrogen phosphate ion salt, a dihydrogen phosphate ion salt, a pyrophosphate ion salt or pyrophosphoric acid, and the mixtures thereof, and (b) at least one polyhydroxy substance selected from among the group comprising or, alternatively, consisting of sucrose, fructose, lactose, lactitol, trehalose or mannitol, and the mixtures thereof, and preferably (c) L-cysteine, to obtain a cryoprotected biomass of bacterial cells (cryoprotected biomass);

(iv) freeze-drying the cryoprotected biomass obtained from step (iii) to obtain the freeze-dried biomass.

According to an embodiment, the bacterial cells in the freeze-dried biomass are naked cells, i.e. devoid of an outer lining.

According to another embodiment, the bacterial cells in the freeze-dried biomass are micro-encapsulated cells, preferably in a lipid matrix or in a glycoprotein matrix.

Freeze-dried biomass is produced by means of a method for preparing a biomass of freeze-dried bacterial cells comprising the following steps:

(i) fermenting a previously prepared biomass of bacterial cells (bacterial biomass) comprising at least one strain of bacterial cells to obtain a fermented biomass of bacterial cells (fermented biomass);

(ii) concentrating the fermented biomass obtained from step (i) up to obtaining a concentrated biomass of bacterial cells (concentrated biomass) having a concentration of bacterial cells comprised between $1\times10^6$ cells/ml of liquid biomass and $1\times10^{12}$ cells/ml of liquid biomass;

(iii) mixing the concentrated biomass obtained from step (ii) with a solution comprising, or alternatively, consisting of: (a) at least one phosphorous salt selected from among the group comprising or, alternatively, consisting of a phosphate ion salt or phosphoric acid, a phosphite ion salt or phosphorous acid, a monohydrogen phosphate ion salt, a dihydrogen phosphate ion salt, a pyrophosphate ion salt or pyrophosphoric acid, and the mixtures thereof, and (b) at least one polyhydroxy substance selected from among the group comprising or, alternatively, consisting of sucrose, fructose, lactose, lactitol, trehalose or mannitol, and the mixtures thereof, and preferably (c) L-cysteine, to obtain a cryoprotected biomass of bacterial cells (cryoprotected biomass);

(iv) freeze-drying the cryoprotected biomass obtained from step (iii) to obtain the freeze-dried biomass.

The method for preparing the freeze-dried biomass according to an embodiment of the present invention comprises step (i) in which the bacterial biomass prepared previously and comprising at least one strain of bacterial cells is fermented to obtain the fermented biomass.

According to an embodiment, the bacterial biomass intended for step (i) comprises at least one strain of bacterial cells selected from among the group comprising or, alternatively, consisting of strains of bacterial cells belonging to the families: Firmicutes, Actibacteria, Bacteroidetes, Proteobacteria, and mixtures thereof. Said at least one strain of bacterial cells is selected from among the group comprising or, alternatively, consisting of strains of bacterial cells belonging to the genera: *Lactobacillus, Bifidobacterium, Streptococcus, Lactococcus, Akkemiansia, Intestinimonas, Eubacterium, Faecalibacterium, Neisseria, Roseburia, Cutibacterium* and mixtures thereof. Said at least one strain of bacterial cells is selected from among the group comprising or, alternatively, consisting of strains of bacterial cells belonging to the species: *Lactobacillus acidophilus, Lactobacillus buchneri, Lactobacillus fermentum, Lactobacillus salivarius* subsp. *salivarius, Lactobacillus crispatus, Lactobacillus paracasei* subsp. *paracasei, Lactobacillus gasseri, Lactobacillus plantarum, Lactobacillus delbrueckii* subsp. *bulgaricus, Lactobacillus delbrueckii* subsp. *delbrueckii, Lactobacillus rhamnosus, Lactobacillus pentosus, Lactobacillus fermentum, Lactobacillus brevis, Lactobacillus casei, Lactobacillus reuteri, Lactobacillus johnsonii, Bifidobacterium adolescentis, Bifidobacterium animalis* subsp. *lactis, Bifidobacterium breve, Bifobacterium catenulatum, Bifobacterium pseudocatenulatum, Bifidobacterium bifidum, Bifidobacterium lactis, Bifidobacterium infantis, Bifidobacterium longum, Akkermansia munichipila, Intestinimonas butyriciproducens, Eubacterium hallii, Faecalobacterium prausnitzii, Neisseria lactamica, Roseburia hominis, Cutibacterium acnes,* and mixtures thereof.

At the end of the fermentation step (i) there is obtained a bacterial biomass which is subjected to a concentration according to step (ii).

According to an embodiment, step (ii) is conducted by means of a separation step, in which a liquid fraction is separated from a solid or cellular fraction consisting precisely of the bacterial cells grown in the liquid fermentation substrate (or fermentation broth) of step (i). In an embodiment, said separation step can be carried out by means of centrifugation.

The separation step allows to separate from the bacterial biomass, which is in the physical state of a solution, the liquid fraction contained therein so that the biomass increasingly focuses on the other components such as, for example, bacterial cells.

In step (iii) the concentrated biomass obtained from step (ii) is mixed with the solution comprising, or alternatively, consisting of: phosphorus salt (a) and polyhydroxy substance (b) (i. e. sucrose, fructose, lactose, lactitol, trehalose or mannitol, and mixtures thereof, and preferably (c) L-cysteine.

Such a solution (or cryoprotection solution) is capable of conferring to the concentrated biomass a cryoprotection in the sense that the bacterial biomass is cryoprotected. This means that the cells of the bacterial strain used, contained in said bacterial biomass, are cryoprotected. Cell cryoprotection means that the biological tissues (for example the cell membrane) of the cells of the bacterial strain are protected from possible damage resulting from freezing in the step (iv) of freeze-drying the cryoprotected biomass. By way of example, damage to the cells could comprise a laceration or a lesion of the cell membrane, accompanied by a possible increase in permeability through the membrane.

According to an embodiment, at least one phosphorus salt (a) is selected from among the compounds of potassium phosphate ($K_3PO_4$), potassium monohydrogen phosphate ($K_2HPO_4$), potassium di-hydrogen phosphate ($KH_2PO_4$) and/or potassium pyrophosphate ($K_4P_2O_7$; CAS No. 7320-34-5).

According to an embodiment, sucrose could be used as a polyhydroxy substance (b).

According to an embodiment, sucrose could be present at a concentration comprised from 25% W/V to 45% W/V, preferably of 40% W/V, where % W/V is used to indicate a percentage by weight (i.e. grams) of sucrose with respect to the total volume of the cryoprotection solution (considering such solution before mixing it with the bacterial biomass in step (iii)).

According to an embodiment, the concentration of the phosphorus salt or salts (a) in the solution used in step (iii) could be comprised from 6% to 20% W/V, preferably comprised from 6% to 15% W/V, even more preferably comprised from 10% to 14% W/V, where % W/V is used to indicate a percentage by weight (i.e. grams) of the aforementioned compounds with respect to the total volume of the solution.

According to an embodiment, L-cysteine in the solution used in step (iii) could be present at an amount comprised from 0.5 grams of L-cysteine to 5 grams of L-cysteine per each litre of solution, preferably comprised from 1 gram to 4 grams of L-cysteine per each litre of solution, even more preferably comprised from 2 grams to 3 grams of L-cysteine per each litre of solution.

Specifically, L-cysteine (CAS No. 52-90-4) serves as an oxygen sequestrant and therefore, when added to the solution, it limits or prevents the formation of reactive oxygen species (ROS). Furthermore, L-cysteine is characterised by a low molecular weight, and therefore it can easily penetrate the cell membranes of the bacterial cells, thus increasing protection from damage resulting from oxygen free radicals, and improving the integrity of the membrane structure.

In step (iv) the cryoprotected biomass obtained from step (iii) is freeze-dried to obtain a freeze-dried biomass.

Unless otherwise indicated, the expression "to freeze-dry" or "freeze-drying" will be used to indicate a controlled dehydration of the pre-frozen cryoprotected biomass, and it will be used to indicate entire freeze-drying process (freezing, primary drying and secondary drying).

According to an embodiment, the freeze-drying step (iv) comprises, after step (iii), the following steps:

(iv.a) freezing the cryoprotected biomass obtained from step (iii) to obtain a frozen biomass;

(iv.b) subliming the ice (or drying) of the frozen biomass obtained from step (iv.a) to obtain the freeze-dried biomass.

Preferably, the sublimation of step (iv.b) comprises a primary drying step (iv.b.1) of the frozen biomass obtained from step (iv.a), and a subsequent secondary drying (or desorption) (iv.b.2), on the biomass obtained from step (iv.b.1), to obtain the freeze-dried biomass.

In the primary drying step (iv.b.1), the frozen biomass obtained from step (iv.a) is initially subjected to a reduced pressure, so as to sublimate a part of the frozen solution, to obtain a biomass at reduced pressure and subsequently, in the secondary drying step (iv.b.2), the biomass at reduced pressure is heated to obtain the freeze-dried biomass.

Preferably, the secondary drying step (iv.b.2) starts when all the ice is sublimated from the biomass at reduced pressure in the previous primary drying step (iv.b.1). In the secondary drying step (iv.b.2) the solution adsorbed on the biomass at reduced pressure obtained from the primary drying step (iv.b.1) is desorbed, by increasing the biomass temperature at reduced pressure.

According to an embodiment, the secondary drying step (iv.b.2) ends when the humidity of the biomass is comprised from 0.5% to 2.5% by weight, preferably comprised from 0.75% to 2.0% by weight, more preferably comprised from 0.9% to 1.5% by weight, even more preferably comprised from 0.95% to 1.1% by weight of the biomass.

According to an embodiment, the cytofluorometry method applied to the freeze-dried biomass is further applied to the fermented biomass obtained from step (i), to the concentrated biomass obtained from step (ii) and/or to the cryoprotected biomass obtained from step (iii), to evaluate the viability/integrity of the bacterial cells in the fermented biomass, in the concentrated biomass and/or in the cryoprotected biomass, preferably for evaluating the viability/integrity of the bacterial cells in all biomasses, namely in the fermented biomass, in the concentrated biomass and in the cryoprotected biomass.

According to a preferred embodiment, the evaluation of the viability/integrity of the bacterial cells in the fermented biomass, in the concentrated biomass, and/or in the cryoprotected biomass and in the freeze-dried biomass, can be used to monitor and/or regulate the process parameters governing step (i), step (ii) and/or step (iii), and step (iv).

In other words, monitoring and evaluating the viability/integrity of the bacterial cells conducted in at least one portion of, preferably in all, steps of the method for preparing the biomass of bacterial cells, allows to optimise the process in each of the individual steps of the preparation process in order to obtain a biomass of freeze-dried, stable, viable and high concentration bacterial cells, by means of a reproducible, reliable and optimised process.

Besides steps (i), (ii), (iii) and (iv), according to an embodiment the method may comprise a step (v) subsequent to step (iv).

In the preferred step (v) the freeze-dried biomass obtained from step (iv) is crushed to obtain a crushed biomass.

As a matter of fact, should the freeze-dried biomass obtained from step (iv) be a compact mass (cake), this mass must be crushed, ground, or broken up, in order to obtain the crushed biomass. Preferably, the crushing of step (v) is carried out by means of a mesh or a sieve.

More precisely, in the preferred step (v), the compact mass or cake obtained from step (iv) is forced through the aforementioned mesh or through the aforementioned sieve in order to crush, grind, or break up the compact mass.

A crushed biomass, obtained at the end of step (v), is in the form of powder or granule, and it is easier to manage and handle with respect to the freeze-dried biomass of step (iv). For example, such improved handling may be useful in subsequent weighing and/or packaging operations.

Besides steps (i), (ii), (iii) and (iv), according to an embodiment the method may comprise a step (vi) subsequent to step (v).

In the preferred step (vi), the crushed biomass obtained from step (v) is packaged in a sterile container, preferably in the absence of moisture, to obtain a packaged biomass.

In an embodiment, the packaged biomass obtained from step (vi) is packaged in the sterile container so that the amount of head space in the sterile container (specifically, the amount of air between the packaged biomass and the top of the container) is very small. Preferably, the amount of head space is negligible (i.e., almost zero).

According to an embodiment, the packaged biomass has a bacterial cell concentration comprised from $1 \times 10^8$ cells/g to $1 \times 10^{11}$ cells/g, preferably a concentration comprised from $1 \times 10^9$ cells/g to $1 \times 10^{10}$ cells/g, per gram of packaged biomass obtained at the end of step (vi).

Besides steps (i), (ii), (iii) and (iv), according to an embodiment the method may comprise a step (vii) subsequent to step (vi).

In the preferred step (vii), the packaged biomass obtained from step (vi) is reconstituted with water after a predetermined time to obtain a reconstituted biomass.

According to different embodiments, the water used in step (vii) is selected from among the group comprising or, alternatively, consisting of pure water, saline solution, or buffer solution.

With respect to the predefined time of step (vii), such time is preferably comprised from 1 minute to 10 years, preferably comprised from 1 day to 5 years, more preferably comprised from 4 months or from 12 months to 48 months, even more preferably from 18 months to 32 months, further preferable from 24 months to 30 months, even under conditions of Zone IV.A and Zone IV.B. (geographical zones identified by the World Health Organization).

According to an embodiment, the reconstitution of step (vii) provides for a re-addition of a volume of water to the packaged biomass obtained from step (vi), typically, but not necessarily, equivalent to the volume reduced during freeze-drying of step (iv).

According to an embodiment, the packaged freeze-dried biomass obtained from step (vi) could be reconstituted (hydrated) in step (vii) as an aqueous solution, preferably by means of an isotonic aqueous solution, even more preferably at a substantially neutral pH value or in any case comprised from 6.0 to 7.0. Such pH value comprised from 6.0 to 7.0 is particularly preferred for a packaged biomass obtained from step (vi) in which the bacterial cells are naked cells, i.e. devoid of an outer lining.

According to an embodiment, the packaged freeze-dried biomass obtained from step (vi) could be reconstituted (hydrated) in step (vii) as an aqueous solution of a borate buffer solution at pH 8.4. Such pH value 8.4 is particularly preferred for a packaged biomass obtained from step (vi) in which the bacterial cells are micro-encapsulated cells, preferably in a lipid matrix or in a glycoprotein matrix.

According to an embodiment, in the reconstitution of step (vii), the packaged biomass obtained from step (vi) is diluted up to obtaining a bacterial cell concentration in the reconstituted biomass comprised from $10^5$ to $10^7$ cells/ml, preferably about $10^6$ cells/ml.

In this regard, the bacterial cell concentration in the reconstituted biomass comprised from $10^5$ to $10^7$ cells/ml, preferably about $10^6$ cells/ml, is preferably obtained by subsequent dilutions with water.

According to another embodiment, besides steps (i), (ii), (iii) and (iv), the method comprises the following steps:

(viii) placing at contact the fermented biomass obtained from step (i), the concentrated biomass obtained from step (ii), the cryoprotected biomass obtained from step (iii), and/or the freeze-dried biomass obtained from step (iv) with two different fluorescent dyes, so as to obtain a fluorescent fermented biomass, a fluorescent concentrated biomass, a fluorescent cryoprotected biomass and/or a fluorescent freeze-dried biomass (indicated in its entirety with the expression "fluorescent biomasses");

(ix) subsequently to step (viii), by means of flow cytofluorometry, detecting an amount of bacterial cells with integral cell membranes (and thus viable or stable) in the fluorescent fermented biomass, in the fluorescent concentrated biomass, in the fluorescent cryoprotected biomass and/or in the fluorescent freeze-dried biomass.

According to an embodiment, in the detection step of step (ix) and according to the method set forth in the ISO 19344:2015(E) standard, a first dye permeable through the cell membranes (preferably: thiazole orange or, alternatively, SYTO® 24—a fluorescent dye in the green spectrum) is capable of penetrating into all bacterial cells, providing the total fluorescent units or cells (TFU) of the fluorescent biomasses. A second dye (preferably: propidium iodide) is capable of penetrating only into the bacterial cells with a damaged cell membrane, providing the non-active or non-viable fluorescent units or cells (nAFU) of the fluorescent biomasses.

According to an embodiment, the amount of the first dye in the fermented biomass obtained from step (i), or in the concentrated biomass obtained from step (ii), or in the cryoprotected biomass obtained from step (iii), or in the freeze-dried biomass obtained from step (iv)—in the latter case, the freeze-dried biomass being obtained as reconstituted biomass from step (vii)—is comprised from 0.1 µmol/litre to 1 µmol/litre, per litre of a biomass to be analysed having a bacterial cell concentration comprised from $10^5$ to $10^7$ cells/ml, preferably of $10^6$ cells/ml.

According to an embodiment, the amount of the second dye in the fermented biomass obtained from step (i), or in the concentrated biomass obtained from step (ii), or in the cryoprotected biomass obtained from step (iii), or in the freeze-dried biomass obtained from step (iv)—in the latter case, the freeze-dried biomass being obtained as reconstituted biomass from step (vii)—is comprised from 1 µmol/litre to 50 µmol/litre, per litre of a biomass to be analysed having a bacterial cell concentration comprised from $10^5$ to $10^7$ cells/ml, preferably of $10^6$ cells/ml.

According to an embodiment, the method for preparing fluorescent dyes is carried out according to para. 5.3.1.3 and 5.3.2 (Protocol B) of the ISO 19344:2015(E) standard. Such fluorescent dyes are added to the biomass to be analysed, diluted in the amounts described in paragraph 9.2.2 of the same standard, with a subsequent incubation of the biomass for a period of time of 15 minutes at a temperature of 37° C. so as to obtain a fluorescent biomass to be analysed. Thereafter, the fluorescent biomass is subjected to the detection step (ix) by means of flow cytofluorometry.

According to an alternative embodiment of step (viii), the fermented biomass obtained from step (i), the concentrated biomass obtained from step (ii), the cryoprotected biomass obtained from step (iii), and/or the freeze-dried biomass obtained from step (iv) may be placed at contact with a BD™ Cell viability Kit (Cat. No. 349480) ready-to-use staining kit, following the instructions provided for, so as to obtain a fluorescent fermented biomass, a fluorescent concentrated biomass, a fluorescent cryoprotected biomass and/or a fluorescent freeze-dried biomass.

According to a particularly preferred embodiment, the amount of viable bacterial cells, with integral cell membranes, can be expressed as active fluorescent units or cells (AFU), i.e. units that are only positive to the first dye in fluorescence analysis (preferably: thiazole orange or, alternatively, SYTO® 24), for which the following correlation applies:

$$TFU = AFU + nAFU$$

where:

TFUs (total fluorescent units) are the total fluorescent bacterial units or cells;

nAFUs (non-active fluorescent units) are the non-active fluorescent bacterial units or cells units, with a non-integral or damaged cell membrane (i.e. the units which are positive to the second dye, preferably propidium iodide).

According to an embodiment, the flow cytofluorometry of step (ix) is configured and/or calibrated to perform volumetric determination of the fluorescent biomasses analysed, and to directly calculate the cell concentration (AFU and TFU).

According to another embodiment, in order to obtain the values of AFU and TFU in the fluorescent biomasses, the flow cytofluorometry of step (ix) uses at least one internal fluorescent standard added to the fluorescent biomasses.

According to an embodiment, the internal fluorescent standard is in the form of a fluorescent ball or bead and it is added to each fluorescent biomass to be analysed in known concentration. The value of AFU and TFU in the fluorescent biomass analysed can then be calculated by proportion to the known amounts of the internal standard.

According to an embodiment, the amount of internal fluorescent standard is added to each fluorescent biomass to be analysed in a volume at known concentration comprised from 20 µl to 100 µl, preferably of 50 µl, for a volume of diluted biomass to be analysed comprised from 0.100 ml to 1.000 ml, preferably of 0.500 ml, where the expression "diluted biomass" is used to indicate a biomass to be analysed having a bacterial cell concentration comprised from $10^5$ to $10^7$ cells/ml, preferably of $10^6$ cells/ml.

Furthermore, the present invention refers to a use of cytofluorometry method applied to a method for preparing a biomass of freeze-dried bacterial cells (freeze-dried biomass), in which the bacterial cells have a cell wall, and in which such cytofluorometry method is for evaluating the integrity of said cell wall of said freeze-dried bacterial cells produced.

Lastly, the present invention refers to a use of a cytofluorometry method for evaluating the integrity of a cell wall present in freeze-dried bacterial cells produced with a method for preparing a biomass of freeze-dried bacterial cells.

Preferred characteristics of the use of the cytofluorometry method applied to the method for preparing the freeze-dried biomass, or of the use of the cytofluorometry method to evaluate the integrity of the cell wall present in cells of freeze-dried bacterial cells produced by the method for preparing the freeze-dried biomass, are illustrated at least in relation to steps (i), (ii), (iii), (iv) of the description outlined above.

An AFU/ml vs. CFU/ml correlation in liquid biomasses such as the biomasses obtained from step (i), step (ii) or step (iii) is exemplified in FIG. 1.

A CFU/g correlation and an AFU/g correlation obtained on the same freeze-dried biomasses obtained from step (iv), at various bacterial cell concentrations, are respectively shown in FIG. 2 and FIG. 3.

As observable from such FIGS. 2 and 3, the bacterial cell count shows a significant difference between the number of cells obtained through plate counting, and the number of cells obtained by the flow cytofluorometry method.

The difference between the two methods is experimentally recognised, and it derives from the cell types, from their physiological state that the two methods implicitly highlight. The plate count depends on the ability of the individual cell to grow and replicate in a culture medium according to the physiological state thereof and the incubation parameters adopted. On the contrary, flow cytofluorometry reads each integral and viable cell within each sample independently from the incubation parameters.

This difference is evident from the analytical expression of the results, CFU/g (FIG. 2) with respect to AFU/g (FIG. 3). Using the results of FIGS. 2 and 3, it is possible to calculate a correlation factor CF (defined as an AFU/CFU ratio) between the two methods, comprised from 1.25 to 1.3.

As observable, the correlation factor CF is surprisingly close to 1, on average≥1 on the liquid biomasses obtained from step (i), step (ii) and step (iii) with the same volume (ml) of biomass.

Such CF factor progressively increases during the subsequent steps of the method for preparing the freeze-dried biomass, given that the steps inevitably cause suffering to the cells and damage such that the bacterial cells can lose the replicative capacity thereof while remaining viable and maintaining membrane integrity. This cell fraction regards viable but non-culturable cells (VBNC).

The CF calculated on freeze-dried biomasses obtained from step (iv) can exceed a factor 1.2 (on average being≥1.25) and grow further in the case of biomasses in which the bacterial cells are micro-encapsulated, given the dissolution of the matrix (preferably lipid or glycoprotein) and the separation of the individual cells that do not give rise to a single colony in plate with consequent underestimation of the bacterial population analysed.

The use of the cytofluorometry method applied to the freeze-dried biomass allows to obtain a stable biomass, with bacterial cells with a well-preserved cell wall in a good physiological state and, therefore, intregral and viable cells.

The use of the cytofluorometry method applied to the method for preparing the freeze-dried biomass allows to measure and evaluate the integrity/viability of the bacterial cells in one part or in all the steps of the method for preparing the freeze-dried biomass, so as to monitor and possibly adjust the parameters of the method for such preparation.

Advantageously, the present uses allow to provide a methodology applicable to a method which can be widely modeled with wide freedom as a function of the type of bacterial cells to be obtained in freeze-dried form.

Advantageously, the present uses of the cytofluorometry method are compatible with the technological-production times of freeze-dried biomasses on an industrial scale, which must be drastically lesser than the retrieval of information by means of plate count.

Advantageously, the present uses of the cytofluorometry method are independent of the physical state of the biomass sample to be analysed, given that the cytofluorometry technique can be exploited for biomasses in liquid phase and in solid phase (after reconstitution).

Advantageously, the present uses of the cytofluorometry method provide extremely accurate information on the intermediate or final biomasses obtained with the preparation method discussed herein.

Advantageously, the present uses of the cytofluorometry method also allow to identify viable but non-culturable cells (VBNC) in the biomass samples. As a matter of fact, the value of CFU obtainable by conventional plate count on the bacterial cells does not account for dormant or non-colony-generating cells, but which in any case exhibit metabolic activity or which—under suitable environmental conditions (for example at contact with the enteric system)—could recover from sublethal damage.

Preferred embodiments according to the present invention are indicated hereinafter.

E1. A use of a cytofluorometry method applied to a biomass of freeze-dried bacterial cells (freeze-dried biomass), wherein said cytofluorometry method is for evaluating the stability of said freeze-dried bacterial cells wherein said freeze-dried biomass is produced by means of a method for preparing a biomass of freeze-dried bacterial cells comprising the following steps:

(i) fermenting a previously prepared biomass of bacterial cells (bacterial biomass) comprising at least one strain of bacterial cells to obtain a fermented biomass of bacterial cells (fermented biomass);

(ii) concentrating the fermented biomass obtained from step (i) up to obtaining a concentrated biomass of bacterial cells (concentrated biomass) having a concentration of bacterial cells comprised between $1\times10^6$ cells/ml of liquid biomass and $1\times10^{12}$ cells/ml of liquid biomass;

(iii) mixing the concentrated biomass obtained from step (ii) with a solution comprising, or alternatively, consisting of: (a) at least one phosphorous salt selected from among the group comprising or, alternatively, consisting of a phosphate ion salt or phosphoric acid, a phosphite ion salt or phosphorous acid, a monohydrogen phosphate ion salt, a dihydrogen phosphate ion salt, a pyrophosphate ion salt or pyrophosphoric acid, and the mixtures thereof, and (b) at least one polyhydroxy substance selected from among the group comprising or, alternatively, consisting of sucrose, fructose, lactose, lactitol, trehalose or mannitol, and the mixtures thereof, and preferably (c) L-cysteine, to obtain a cryoprotected biomass of bacterial cells (cryoprotected biomass);

(iv) freeze-drying the cryoprotected biomass obtained from step (iii) to obtain the freeze-dried biomass.

E2. The use according to E1, wherein said cytofluorometry method is further applied to the fermented biomass obtained from step (i), to the concentrated biomass obtained from step (ii) and/or to the cryoprotected biomass obtained from step (iii), to evaluate the viability/integrity of the bacterial cells in said fermented biomass, in said concentrated biomass and/or in said cryoprotected biomass.

E3. The use according to E2, wherein said evaluation of the viability/integrity of said bacterial cells is used for monitoring and/or adjusting the process parameters that control step (i), step (ii) and/or step (iii), and step (iv).

E4. The use according to any one of the embodiments E1-E3, wherein the method comprises, besides steps (i), (ii), (iii) and (iv), the following steps:
(viii) placing at contact the fermented biomass obtained from step (i), the concentrated biomass obtained from step (ii), the cryoprotected biomass obtained from step (iii), and/or the freeze-dried biomass obtained from step (iv) with two different fluorescent dyes, so as to obtain a fluorescent fermented biomass, a fluorescent concentrated biomass, a fluorescent cryoprotected biomass and/or a fluorescent freeze-dried biomass;
(ix) subsequently to step (viii), by means of flow cytofluorometry, detecting an amount of bacterial cells with integral cell membranes in the fluorescent fermented biomass, in the fluorescent concentrated biomass, in the fluorescent cryoprotected biomass and/or in the fluorescent freeze-dried biomass.

E5. The use according to E4, wherein said amount is expressed as active fluorescent units or cells (AFU) regarding which the following correlation applies:

$$TFU = AFU + nAFU$$

wherein:
TFUs (total fluorescent units) are the total fluorescent bacterial units or cells;
nAFU (non active fluorescent units) are the non-active fluorescent bacterial units or cells, with a damaged cell membrane.

E6. The use according to any one of the preceding embodiments, wherein the bacterial cells in the freeze-dried biomass are naked cells, devoid of an outer lining.

E7. The use according to any one of the embodiments E1-E5, wherein the bacterial cells in the freeze-dried biomass are micro-encapsulated cells in a lipid matrix or in a glycoprotein matrix.

E8. A use of a cytofluorometric method applied to a method for preparing a biomass of freeze-dried bacterial cells, wherein the bacterial cells have a cell wall, and wherein said cytofluorometric method is for evaluating the integrity of said cell wall of said freeze-dried bacterial cells, produced according to any one of the preceding embodiments.

E9. A use of a cytofluorometric method for evaluating the integrity of a cell wall present in freeze-dried bacterial cells produced with a method for preparing a biomass of freeze-dried bacterial cells, according to any one of the preceding embodiments.

E10. A method for evaluating the integrity of the cell wall of freeze-dried bacterial cells, wherein the bacterial cells have a cell wall, said method being characterised in that it uses a cytofluorometry method applied to a biomass of freeze-dried bacterial cells according to any one of the preceding embodiments.

E11. The method according to E10, wherein said biomass of freeze-dried bacterial cells (freeze-dried biomass) wherein said freeze-dried biomass is produced by means of a method for preparing a biomass of freeze-dried bacterial cells comprising the following steps:
(i) fermenting a previously prepared biomass of bacterial cells (bacterial biomass) comprising at least one strain of bacterial cells to obtain a fermented biomass of bacterial cells (fermented biomass);
(ii) concentrating the fermented biomass obtained from step (i) up to obtaining a concentrated biomass of bacterial cells (concentrated biomass) having a concentration of bacterial cells comprised between $1 \times 10^6$ cells/ml of liquid biomass and $1 \times 10^{12}$ cells/ml of liquid biomass;
(iii) mixing the concentrated biomass obtained from step (ii) with a solution comprising, or alternatively, consisting of: (a) at least one phosphorous salt selected from among the group comprising or, alternatively, consisting of a phosphate ion salt or phosphoric acid, a phosphite ion salt or phosphorous acid, a monohydrogen phosphate ion salt, a dihydrogen phosphate ion salt, a pyrophosphate ion salt or pyrophosphoric acid, and the mixtures thereof, and (b) at least one polyhydroxy substance selected from among the group comprising or, alternatively, consisting of sucrose, fructose, lactose, lactitol, trehalose or mannitol, and the mixtures thereof, and preferably (c) L-cysteine, to obtain a cryoprotected biomass of bacterial cells (cryoprotected biomass);
(iv) freeze-drying the cryoprotected biomass obtained from step (iii) to obtain the freeze-dried biomass.

E12. A cytofluorometric method applied to a biomass of freeze-dried bacterial cells (freeze-dried biomass), wherein said cytofluorometric method is for evaluating the stability of said freeze-dried bacterial cells.

E13. The method according to E12 wherein said stability is evaluated by determining the cell wall integrity of said freeze-dried bacterial cells.

The invention claimed is:

1. A method comprising
performing cytofluorometry on a freeze-dried biomass comprising freeze-dried bacterial cells, the cytofluorometry preformed for evaluating integrity of cell walls of the freeze dried bacteria conferring stability of said freeze-dried bacterial cells wherein said freeze-dried biomass is produced by:
fermenting a previously prepared bacterial biomass comprising at least one strain of bacterial cells to obtain a fermented biomass;
concentrating the fermented biomass up to obtaining a concentrated biomass having a concentration of bacterial cells between $1 \times 10^6$ cells/ml of liquid biomass and $1 \times 10^{12}$ cells/ml of liquid biomass;
mixing the concentrated biomass with a solution comprising
(a) at least one phosphorous salt selected from the group comprising a phosphate ion salt, phosphoric acid, a phosphite ion salt, phosphorous acid, a monohydrogen phosphate ion salt, a dihydrogen phosphate ion salt, a pyrophosphate ion salt, pyrophosphoric acid, and the mixtures thereof, and
(b) at least one polyhydroxy substance selected from the group comprising sucrose, fructose, lactose, lactitol, trehalose, mannitol, and the mixtures thereof,
to obtain a cryoprotected biomass; and
freeze-drying the cryoprotected biomass to obtain the freeze-dried biomass.

2. The method according to claim 1, further comprising performing cytofluorometry on the fermented biomass, the concentrated biomass and/or the cryoprotected biomass, to obtain an evaluated viability/integrity of the bacterial cells in said fermented biomass, in said concentrated biomass and/or in said cryoprotected biomass.

3. The method according to claim 2, wherein said evaluated viability/integrity of said bacterial cells is used for monitoring and/or adjusting the process parameters that control the fermenting step, the concentration step, the mixing step, and/or the freeze-drying step.

4. The method according to claim 1, further comprising the following steps:
contacting the fermented biomass, the concentrated biomass, the cryoprotected biomass, and/or the freeze-dried biomass with two different fluorescent dyes, to obtain a fluorescent fermented biomass, a fluorescent concentrated biomass, a fluorescent cryoprotected biomass and/or a fluorescent freeze-dried biomass; and
detecting by cytofluorometry an amount of bacterial cells with integral cell membranes in the fluorescent fermented biomass, in the fluorescent concentrated biomass, in the fluorescent cryoprotected biomass and/or in the fluorescent freeze-dried biomass.

5. The method according to claim 4, wherein said amount is expressed as active fluorescent units or cells (AFU) regarding which the following correlation applies:

$$TFU = AFU + nAFU$$

wherein:
TFUs (total fluorescent units) are the total fluorescent bacterial units or cells;
nAFU (non active fluorescent units) are the non-active fluorescent bacterial units or cells, with a damaged cell membrane.

6. The method according to claim 1, wherein the bacterial cells in the freeze-dried biomass are naked cells, devoid of an outer lining.

7. The method according to claim 1, wherein the bacterial cells in the freeze-dried biomass are micro-encapsulated cells in a lipid matrix or in a glycoprotein matrix.

8. The method of claim 1, wherein the solution of the mixing step further comprises (c) L-cysteine.

9. A method for preparing a freeze-dried biomass of freeze-dried bacterial cells having a cell wall, the method comprising
performing cytofluorometry on said freeze-dried biomass for evaluating the integrity of said cell wall of said freeze-dried bacterial cells, the freeze dried biomass produced by
fermenting a previously prepared bacterial biomass comprising at least one strain of bacterial cells to obtain a fermented biomass;
concentrating the fermented biomass up to obtaining a concentrated biomass having a concentration of bacterial cells between $1\times10^6$ cells/ml of liquid biomass and $1\times10^{12}$ cells/ml of liquid biomass;
mixing the concentrated biomass with a solution comprising (a) at least one phosphorous salt selected from the group comprising
(a) a phosphate ion salt, phosphoric acid, a phosphite ion salt, phosphorous acid, a monohydrogen phosphate ion salt, a dihydrogen phosphate ion salt, a pyrophosphate ion salt, pyrophosphoric acid, and the mixtures thereof, and
(b) at least one polyhydroxy substance selected from the group comprising sucrose, fructose, lactose, lactitol, trehalose, mannitol, and the mixtures thereof, to obtain a cryoprotected biomass; and
freeze-drying the cryoprotected biomass to obtain the freeze-dried biomass.

10. The method of claim 9, wherein the solution of the mixing step further comprises (c) L-cysteine.

* * * * *